Jan. 15, 1963

H. VILLANUEVA 3,073,360

RADIAL ARM MOUNTING MEANS FOR
HAND-OPERABLE PORTABLE SAWS

Filed Feb. 10, 1961

HECTOR VILLANUEVA
INVENTOR.

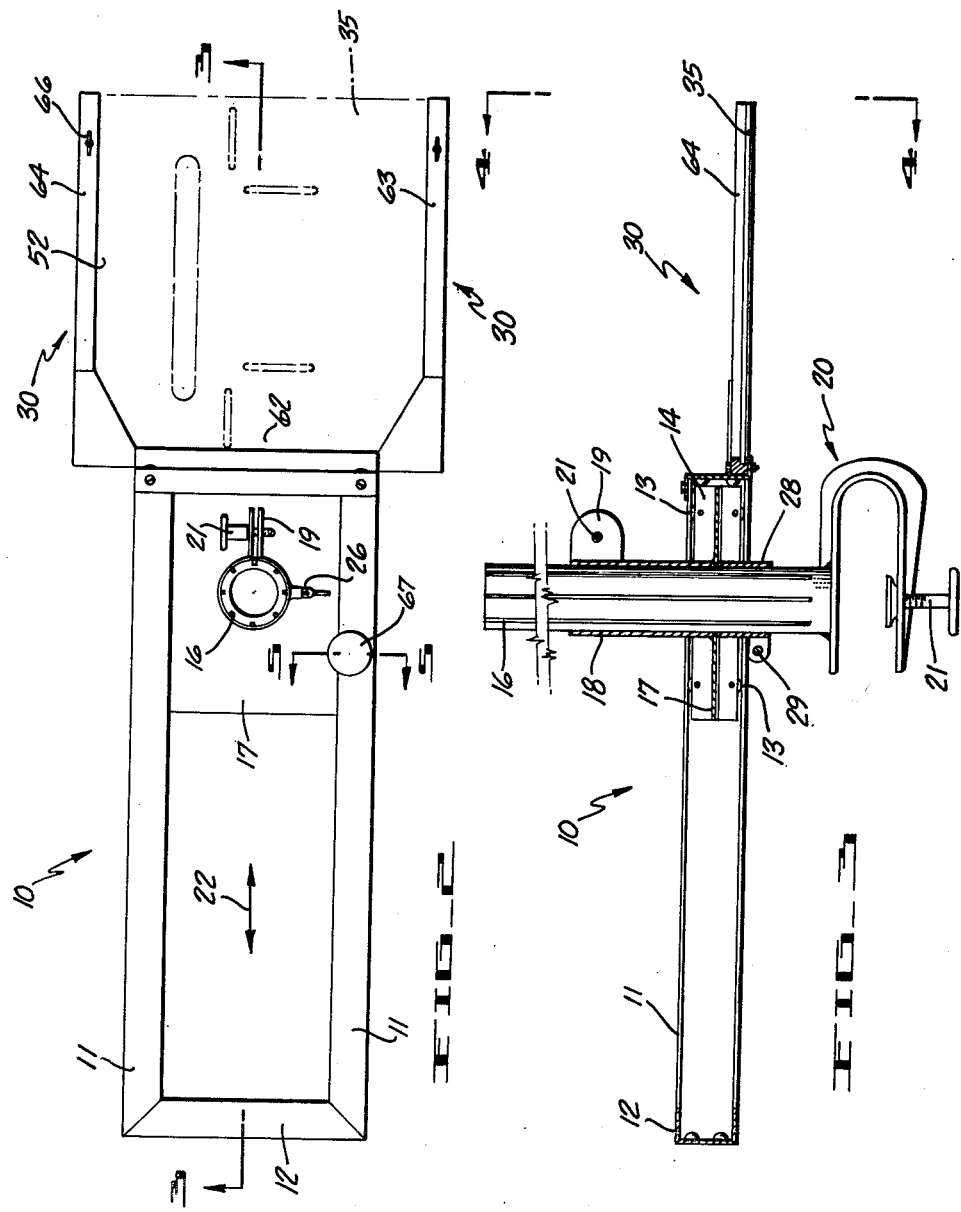

Jan. 15, 1963
H. VILLANUEVA
3,073,360
RADIAL ARM MOUNTING MEANS FOR
HAND-OPERABLE PORTABLE SAWS
Filed Feb. 10, 1961
3 Sheets-Sheet 3
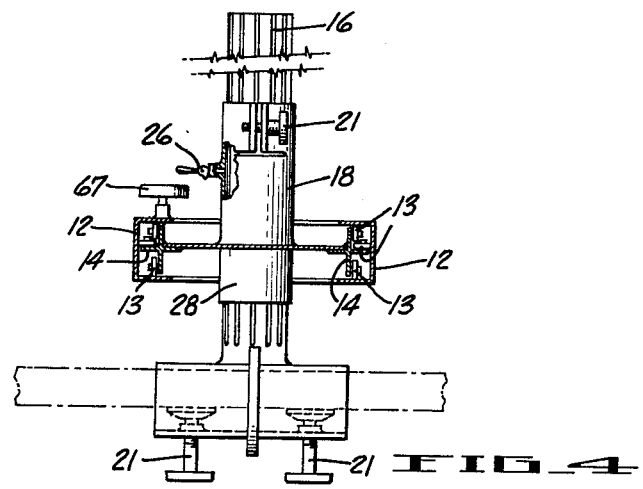
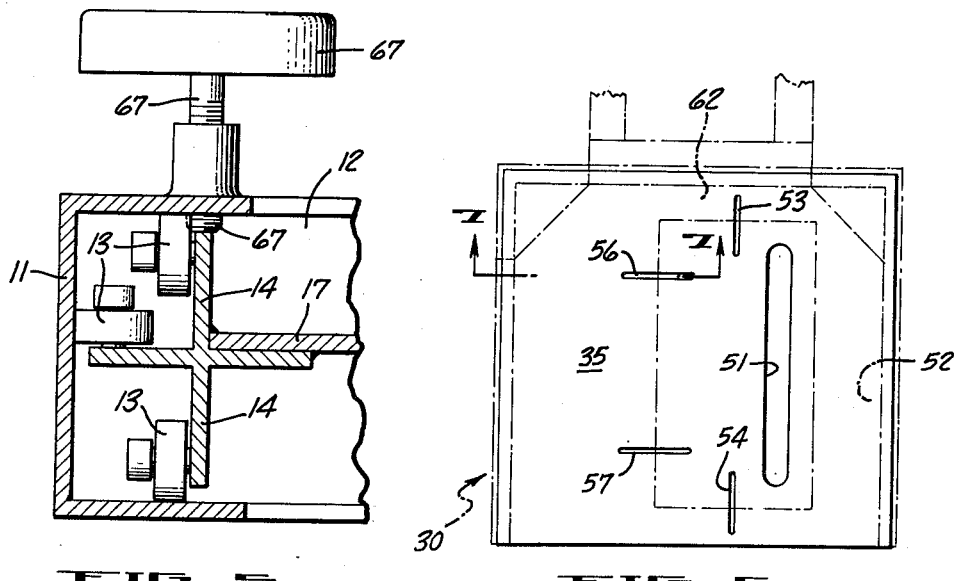
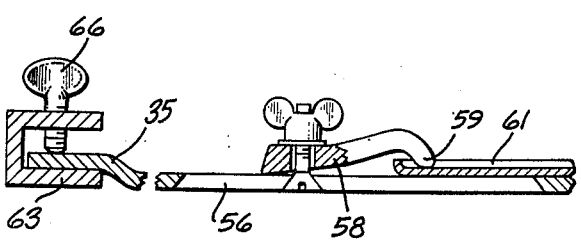
HECTOR VILLANUEVA
INVENTOR.

United States Patent Office 3,073,360
Patented Jan. 15, 1963

3,073,360
RADIAL ARM MOUNTING MEANS FOR HAND-OPERABLE PORTABLE SAWS
Hector Villanueva, 2028 McAllister St., San Francisco, Calif.
Filed Feb. 10, 1961, Ser. No. 88,447
9 Claims. (Cl. 143—6)

This invention relates to mounts for saws, and particularly to mounting means for hand-operable portable power saws.

In the course of constructing a building it is required to convert random lengths of lumber into exact lengths. It has heretofore been found desirable to set up a table saw and/or swing saw on the site.

The above devices usually consist of a heavy frame and electric motor for driving the saw, and feature settings and adjustments which render many advantages necessary to accomplish the task at hand. However, these saws do possess several disadvantages, such as their weight and cumbersome size.

For this reason, they are usually mounted upon a trailer of the two-wheeled variety, which might be towed to the site by another vehicle, or they might be so constructed as to require delivery on the site by a pickup truck, whereupon they are set up as a non-portable saw after unloading and thereafter may not be moved except with considerable effort and loss of time.

A final disadvantage is the prohibitive cost of the saws generally used.

It is usually another requirement for on-the-site construction that one or more portable power saws be employed. Saws of this variety are capable, if properly guided, of making cuts the equivalent of those made possible by the table or swing saws, and they can be used anywhere on the site during the course of construction and are of primary utility because of their portability and power.

Portable saws, however, by their nature, lack solid mounts and guide means for making precise cuts, and their usefulness ordinarily goes only so far as the skill of the user. For the most accurate cuts, the sawer must rely upon the non-portable table saw.

It is therefore an object of my invention to provide a portable mount which is adaptable to receive a portable power hand saw, thus to endow the portable saw with the capabilities of a table and/or swing saw as previously mentioned, while at the same time maintaining the adaptability of the hand saw as a portable instrument.

It is another object of my invention to provide a portable device for mounting a portable power saw upon a saw-horse or similar support.

Another object of my invention is to provide a portable frame associated with a portable power hand saw; the portable frame being provided with adjustments and movements to allow the user to raise and lower the saw mounted in association therewith for depth of cuts; swing from side to side for diagonal cuts while still maintaining adjustability of the saw proper for any and all angular cuts desired to be made, and still further allowing the portable power saw to be readily available for use as a hand unit.

Still another object of my invention is to provide a portable frame and saw combination which will eliminate the necessity of having a table saw or swing saw in use on the site.

Other objects and purposes of my invention will become apparent when viewed in conjunction with the accompanying drawings wherein:

FIGURE 2 is a top plan view of the structure shown in FIGURE 1 with certain frame portions broken away for clarity.

FIGURE 3 is a transverse vertical section view taken along lines 3—3 of FIGURE 2.

FIGURE 4 is an end elevation view, with parts broken away, looking in the direction of lines 4—4 of FIGURE 3.

FIGURE 5 is an enlarged fragmentary sectional view taken along the lines 5—5 of FIGURE 2.

FIGURE 6 is a plan view of an adaptor plate for mounting various saws thereon.

FIGURE 7 is an enlarged fragmentary section view taken on lines 7—7 of FIGURE 6 and including a portion of the saw.

Figure 1:
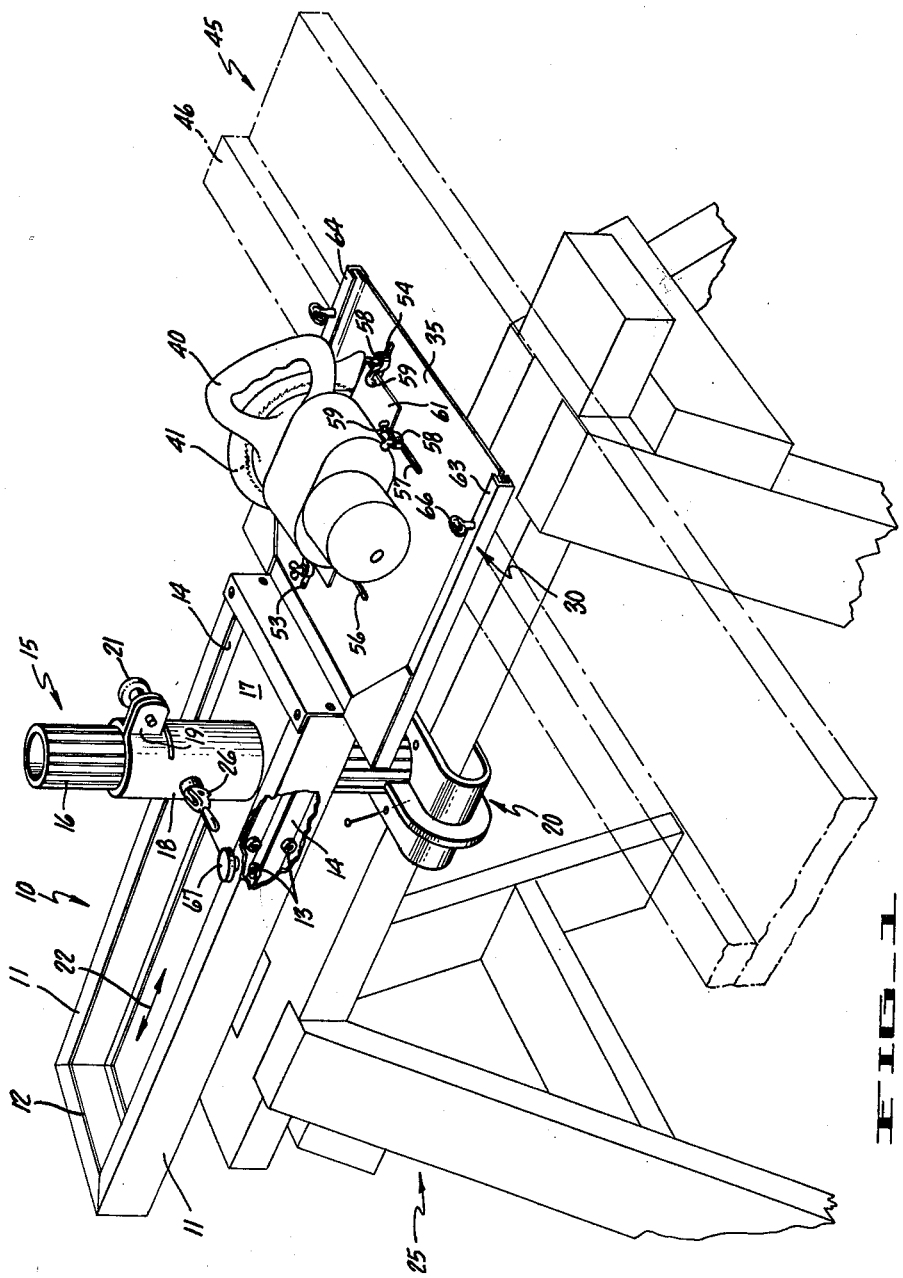
FIGURE 1 is a perspective view of a portable power saw and a mount therefore constructed in accordance with my invention.

Referring to FIGURE 1 there is shown a portable frame member 10 supported by a base member which includes a shaft 15 mounted on a clamping base 20. The base 20 is clamped upon a conventional saw horse 25.

Attached to one end of the frame 10 and forming an integral part therewith is a frame portion 30 which carries an aligning member here shown as a square plate 35 to which is attached a portable power hand saw 40.

Mounted upon the saw horse 25 and generally underneath the saw 40 is shown a cross-member 45 secured to the saw horse, for example, by nails (not shown) in a manner sufficient to hold it in place while being easily removed when dismantling the assembly of elements quickly for relocating same to a different location. It will be understood that the cross-member may rest also upon a second saw horse (not shown) that is parallel with the first.

In setting up the device for use, the clamping base 20 is clamped to the saw horse 25 by tightening the clamping screws 21 (see also FIGURES 3 and 4) on the underneath side of the clamping base 20.

The shaft 15 is splined for a number of grooves 16 which are parallel to the axis of the shaft and running approximately the full length thereof.

The sliding frame 10 includes two parallel side channel members 11 and one end channel member 12. Securely positioned between the members 12 and in rolling relation therewith are a plurality of roller bearings 13 (see FIGURE 5) fixed to corresponding flanges 14 which in turn extend from opposite sides of an intermediate member, here shown as a rectangular plate 17.

It is noted that certain of the rollers 13 are positioned to extend upwardly, certain rollers downwardly, and certain rollers laterally, so as to engage all of the interior faces of the channel members 11.

A tubular bracket 18 forming an integral extension of the plate 17 and centrally located within the boundaries of the plate 17, forms a rigid adapter therefore to be slidably placed over the shaft 15 and thereby support the frame 10 and its associated elements. The bracket 18 terminates in a split collar 19 and threaded screw 21, forming a clamp for fixing the intermediate member 17 in a selected position on the shaft 15.

The bearings 13, fixed to the flanges 14 which in turn are fixed to the plate 17 and supporting bracket 18 form an integral assembly. The parallel channels 11 and thus the sliding frame 10 may be moved freely in the directions shown by the arrow 22 (see FIGURES 1 and 2) but the frame 10 may not move in any other direction such as canting up, down or laterally so long as the clamp 19, 21 is tightened. Thus it is seen that when assembled, the parallel channels 11 form an enclosure around the plate 17 and its associated parts to afford free movement of the frame 10 in two directions through the bearings 13 in engagement therewith.

The clamp 19, 21 provides a means for setting the intermediate member 17 and frame 10 at a desired height above the cross-member 45 so as to regulate the depth of cut in a workpiece mounted on the cross-member 45, and the clamp is also used for setting a particular alignment of the frame 10 at a predetermined angle with respect to the cross-member 45, so that cuts of a desired angle can be accurately and repeatedly made. In this connection, there is provided a retractable key 26 mounted on the bracket 18 for engaging the splined grooves 16 and for thereby limiting the angular position of the intermediate member to one of a predetermined plurality of particular angles. When it is desired to set the saw at an angle other than one of these predetermined angles, the key 26 may be left in retracted position. Also, as will be seen in FIGURE 3, a second split collar 28 and clamping screw 29 is provided to engage the shaft 15 directly beneath the plate 17 so as to support the plate and saw at a chosen height when it is desired to loosen clamp 19, 21 for the purpose of adjusting the saw to a new angle with respect to the cross-member 45.

As an important feature of the invention, the square aligning plate 35 is adapted for mounting the saw 40 with the sawblade 41 thereof either parallel or perpendicular to the direction 22 of reciprocation of the frame member 10. It will be understood that for making cross-cuts on an elongated work piece that is aligned on the cross-member 45, it is desirable to have the saw mounted as shown in FIGURE 1, with the saw blade 41 parallel to the direction 22 of reciprocation of the frame 10, and with the frame 10 aligned on shaft 15 either perpendicular to the cross-member 45 or at a chosen angle thereto; but when it is desired to longitudinally rip the work piece the saw blade 41 should be perpendicular to the direction 22 of reciprocation, with the frame 10 aligned perpendicular to the cross-member 45, and with the movement of frame 10 in direction 22 serving to position the saw blade 41 at a precise parallel spacing from a flange 46 on the cross-member 45, so that the workpiece may be guided by the flange 46 in passing the saw blade during the ripping process. Accordingly, the plate 35 is formed with a slit 51 (FIGURE 6) parallel to one of the rectangular sides 52 of the plate, and spaced pairs of slits 53, 54, 56 and 57 are also formed in the plate. In slits 53—54 and 56—57 are mounted a number of screw clamps 58 (FIGURE 7), each with a hooked portion 59 adapted to fit over the guide plate 61 of the saw 40. By means of the slits 53—54 and 56—57, the clamps 58 may be adjustably spaced apart to fit any standard size of hand power saw guide plate 61, and the saw may thus be mounted on the plate 35 with the blade 41 projecting through the slit 51 and parallel to the side 52. A second side 62 is perpendicular to side 52, and the plate 35 may be mounted in frame portion 30 so that either side 52 or side 62 is parallel to the direction 22 of reciprocation, and thus one or the other of the desired alignments of saw blade 41 must be achieved. Since both the plate 35 and the frame portion 30 are square in outline, the plate will fit solidly either way. The frame portion 30 is formed as shown with a pair of parallel channel members 63 and 64 extending from the body of the frame member 10 for engaging opposite sides of the plate 35, and the members 63 and 64 are provided with threaded screws 66 each traversing one side wall of a channel member 30 as to engage and clamp the plate 35 in fixed position in the frame see FIGURE 7.

Also provided are threaded screw clamps 67 traversing the sidewalls of the channels 11 so as to clampingly engage the flanges 14 and thus lock the frame member 10 in fixed position on the intermediate member 17, when it is desired to set the saw for ripping action as above described see FIGURE 5.

In operation, to set the saw for cross-cutting, the saw 40 is clamped to plate 35 by means of clamps 58 and with blade 41 of the saw projecting through slit 51 of the plate. The plate is then clamped in frame position 30 by means of clamps 66, and with blade 41 parallel to the direction 22 of reciprocation. Clamps 19, 21 and 28, 29, together with retractable key 26 are selectively operated to position the saw blade 41 at the desired height and horizontal angle with respect to the cross-member 45. The workpiece is then aligned on cross-member 45 and abutting the flange 46, and the saw, in operating mode, is drawn across the workpiece to make the cut, the only permitted direction of motion of the saw being that represented by the arrow 22 (FIGURE 1).

To set the saw for ripping action, the plate 35, with saw attached, is removed from frame portion 30. The plate 35 is horizontally rotated 90 degrees and re-clamped in frame portion 30 by means of clamps 66, so that blade 41 is perpendicular to the direction 22 of reciprocation. Clamps 19, 21 and 28, 29, together with retractable key 26 are selectively operated to position the saw blade 41 at the desired height and parallel to cross-member 45. The frame 10 is then reciprocated to position the saw blade 41 at the desired lateral spacing from flange 46, and clamp 67 is then tightened to lock the apparatus in this position. After clamp 67 is locked, no further movement is permitted for the saw; but with the saw in operating mode, the workpiece is moved longitudinally on the cross-member 45, guiding against flange 46, and is ripped from end to end.

It will be understood that many variations of form and structure are possible within the scope of my invention, and I do not desire my invention to be limited to structure other than that defined in the appended claims.

What is claimed is:

1. A mounting for a portable power saw, comprising: a base member having an extended upstanding shaft fixed thereto; an intermediate member comprising a horizontal plate with an upright split-ring collar thereon mounted for axial sliding motion on said shaft and for pivoting motion around said shaft, said horizontal plate having opposite parallel sides serving as guiding elements; means on said collar for clamping said intermediate member in a fixed angular and axial position on said shaft; an elongated substantially rectangular frame member slidably supported on the sides of said intermediate member and enclosing said intermediate member on four sides thereof for reciprocating movement on said intermediate member in a direction perpendicular to the axis of said shaft; and means for attaching said portable power saw to the outside of one end of said frame member for guiding said saw in reciprocating movement across a workpiece.

2. A mounting for a portable power saw, comprising: a base member having an extended upstanding shaft fixed thereto; an intermediate member comprising a horizontal plate with an upright split-ring collar thereon mounted for axial sliding motion on said shaft and for pivoting motion around said shaft, said horizontal plate having opposite parallel sides serving as guiding elements; means on said collar for clamping said intermediate member in a fixed angular and longitudinal position on said shaft; an elongated substantially rectangular frame member slidably supported on the sides of said intermediate member and enclosing said intermediate member on four sides thereof for reciprocating movement on said intermediate member in a direction perpendicular to the axis of said shaft; an aligning member having a pair of mutually perpendicular sides; means for securing said saw to said aligning member with the saw blade thereof parallel to one of said sides; and means for securing said aligning member to the outside of one end of said frame member with one of said sides parallel to the direction of said reciprocating movement.

3. The combination with a work support member and a cross-member mounted thereon for positioning a workpiece, a portable power saw mount comprising: a base member secured to said support member, said base member having an upstanding shaft; an intermediate member comprising a horizontal plate with an upright split-ring collar thereon mounted for axial sliding motion on said shaft for positioning said intermediate member at various heights above said cross-member, said intermediate member also being rotatable on said shaft for alignment at various angles to said cross-member; means for setting said intermediate member in a fixed position and alignment on said shaft said horizontal plate having parallel opposite sides serving as guiding elements; an elongated substantially rectangular frame member slidably supported on the sides of said intermediate member and enclosing said intermediate member on four sides thereof for horizontal reciprocating movement at various angles across said cross-member depending on the alignment setting of said intermediate member with respect to said shaft; an aligning member having a pair of mutually perpendicular sides; means for securing said saw to said aligning member with the saw blade thereof parallel to one of said sides; and means for securing said aligning member to the outside of one end of said frame member with one of said sides parallel to the direction of reciprocation of said frame member with respect to said intermediate member.

4. The combination of claim 3, wherein said shaft is splined and said intermediate member has a retractable key extending therefrom for engaging said splined shaft and for limiting the angular position of said intermediate member to one of a predetermined plurality of particular angles.

5. The combination of claim 3, wherein said means for setting said intermediate member on said shaft includes the split collar of said intermediate member around said shaft; tightening and clamping means on said split collar; and a second separate split collar including tightening and clamping means therefore, said second split collar being mounted around said shaft beneath said intermediate member for supporting said intermediate member for free pivoting motion when said first-named split collar is unclamped.

6. The combination of claim 3, wherein the parallel sides of said intermediate member are fitted with rollers, certain of said rollers extending upwardly, certain rollers downwardly, and certain rollers laterally, and said frame member has a pair of channel portions fitting over and carried by said rollers to provide said reciprocating motion of said frame member.

7. The combination of claim 3 wherein said aligning member comprises a flat square plate with a slit formed therein for said saw blade, said slit being parallel to one of the sides of said plate; means for clamping said saw to said plate with said blade extending through said slit; and wherein said frame member has a square frame portion for receiving and aligning said aligning plate in the plane of reciprocation and square with the direction of reciprocation, whereby said saw and plate may be mounted with the saw blade either parallel to or perpendicular to the direction of reciprocation.

8. The combination of claim 3, and also including means for clamping said frame member in a fixed position on said intermediate member when said saw blade is to be aligned parallel to said cross-member for ripping.

9. A mounting for a portable power saw comprising a mounting post, means on said post for securing it in generally vertical disposition, on a support member, an intermediate member including a clampable collar portion engaging said mounting post for slidable and rotatable movement thereon, said intermediate member including a horizontal plate having parallel opposite side guiding portions, anti-friction means on said side portions, an elongated rectangular frame member enclosing said intermediate member on four sides thereof including opposing channel members engaging said opposite side portions for horizontal reciprocating movement on said intermediate member, and means for mounting a portable power saw on the outside of the forward end of said frame member for guiding said saw in reciprocating movements across a work piece.

References Cited in the file of this patent

UNITED STATES PATENTS

| | | |
|---|---|---|
| 1,706,115 | Hannah | Mar. 19, 1929 |
| 1,846,641 | Hedgpeth | Feb. 23, 1932 |
| 1,867,275 | McCarter | July 12, 1932 |
| 2,392,070 | Snyder | Jan. 1, 1946 |
| 2,602,474 | Truchan | July 8, 1952 |
| 2,630,146 | Van Tuyl | Mar. 3, 1953 |
| 2,718,907 | Fjalstad | Sept. 27, 1955 |
| 2,810,412 | Roug | Oct. 22, 1957 |
| 2,860,014 | Short | Nov. 11, 1958 |
| 3,007,499 | Dobslaw | Nov. 7, 1961 |